March 12, 1929.  T. J. RYAN  1,705,209
CHILD'S VEHICLE
Filed Sept. 12, 1927  2 Sheets-Sheet 1

INVENTOR.
Theodore J. Ryan
BY Arthur P. Knight and
Alfred W. Knight
ATTORNEYS

March 12, 1929.  T. J. RYAN  1,705,209
CHILD'S VEHICLE
Filed Sept. 12, 1927   2 Sheets-Sheet 2
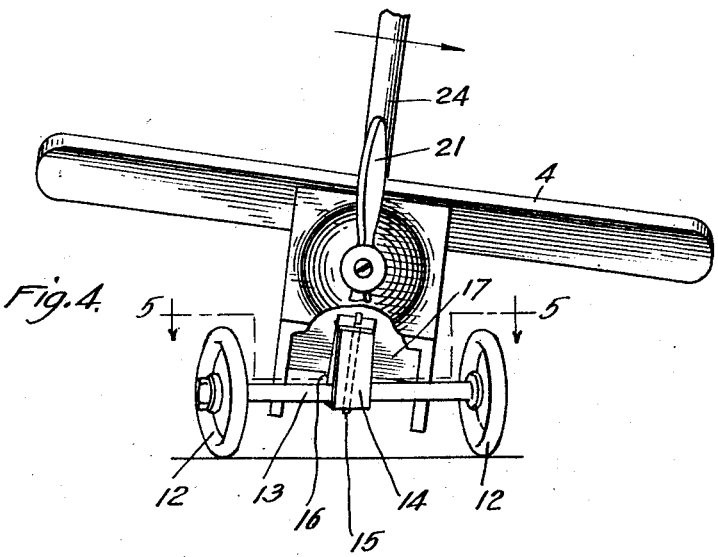
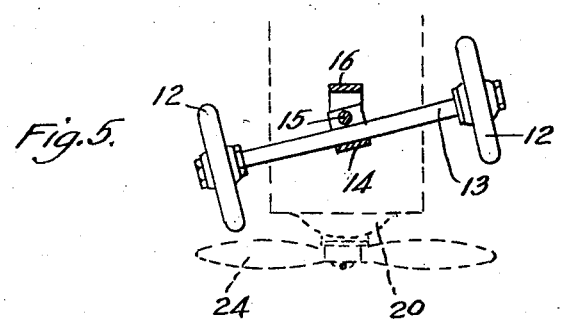
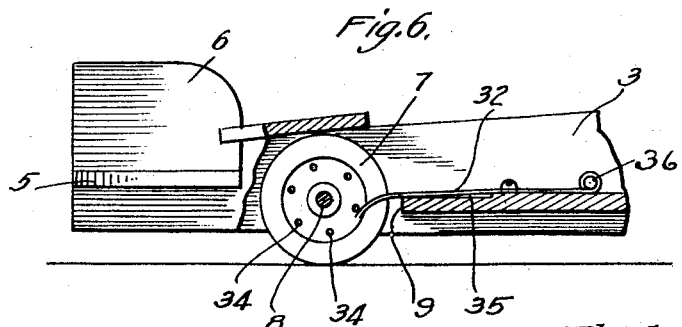
INVENTOR.
Theodore J. Ryan
BY Arthur P. Knight and
Alfred W. Knight
ATTORNEYS Patented Mar. 12, 1929.

1,705,209

UNITED STATES PATENT OFFICE.

THEODORE J. RYAN, OF LOS ANGELES, CALIFORNIA, ASSIGNOR OF SEVEN-EIGHTHS TO O. T. ROSS, OF LOS ANGELES, CALIFORNIA.

CHILD'S VEHICLE.

Application filed September 12, 1927. Serial No. 219,057.

This invention relates to a child's vehicle of the type commonly known as scooters, in which the body is supported by means of one foot placed upon the vehicle, while the other foot is used to propel the vehicle forward by pushing upon the ground.

The principal object of this invention is to provide a vehicle of this type which simulates as far as possible the construction, appearance and manner of steering of an aeroplane.

A particular object of the invention is to provide a scooter which has two wheels in front and one wheel at the rear and which may be steered by tilting the vehicle to one side or the other, as by shifting the weight of the rider's body and by means of a rod extending up from the vehicle so as to be grasped in the hand of the rider.

A further object of the invention is to provide a device adapted to produce, upon operation of the vehicle, a loud noise intended to simulate the noise of an aeroplane motor, and to also provide simple means whereby said noise producing device may be moved into or out of operative position.

The accompanying drawings illustrate a scooter according to my invention and referring thereto:

Fig. 4 is a front elevation of the vehicle tilted to one side to effect turning thereof, with part of the front of the vehicle broken away.

Fig. 5 is a horizontal section on line 5—5 in Fig. 4.

Fig. 6 is a vertical section of the rear portion of the vehicle.

Figure 1:
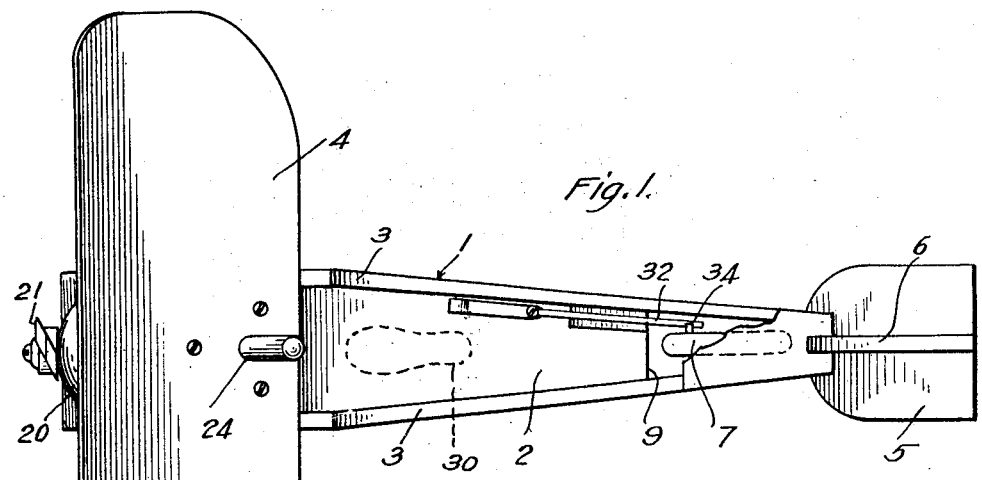
Fig. 1 is a plan view of such scooter.
Figure 2:
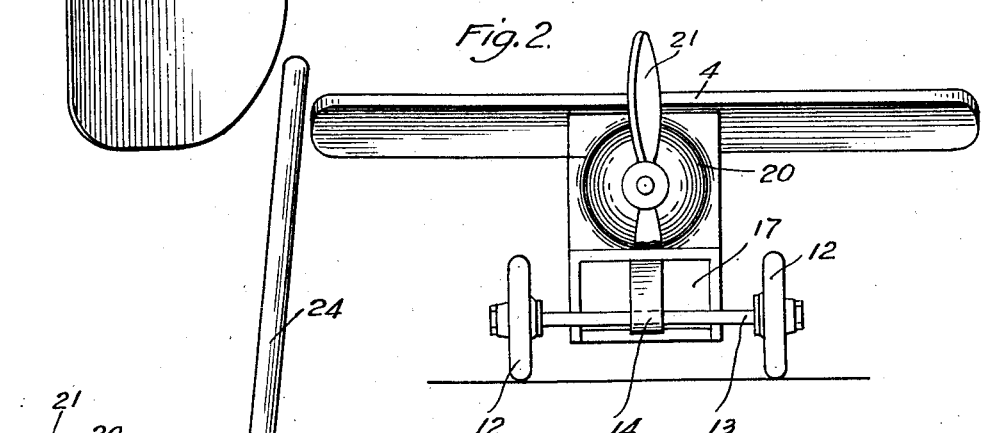
Fig. 2 is a front elevation thereof.
Figure 3:
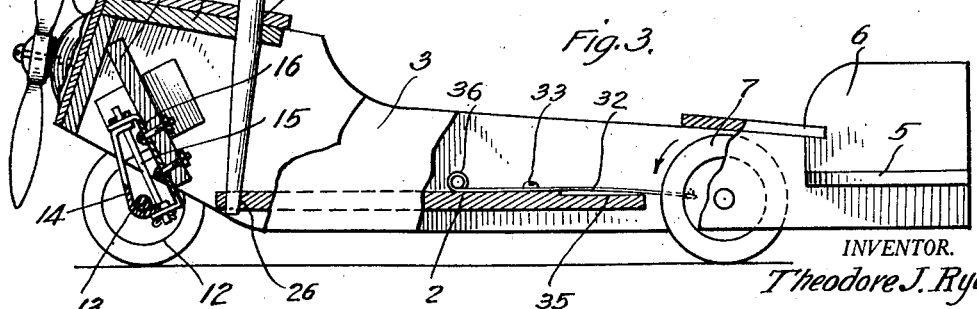
Fig. 3 is a longitudinal section thereof, with certain parts shown in elevation.

The vehicle comprises a body 1 having a bottom or floor portion 2 on which the foot may be placed and preferably having side members 3 extending upwardly from said bottom portion and of a shape, when viewed from the side, corresponding approximately to that of an aeroplane body. The vehicle further comprises a wing member 4 extending transversely across the top of the body at the front end thereof and shaped similarly to an aeroplane wing, and a tail member 5 and rudder-simulating member 6 at the rear end of the body. A single wheel 7 is rotatably mounted beneath the rear portion of the body, as by means of axle or shaft 8, the rear part of the floor member 2 being cut away as indicated at 9 to accommodate this rear wheel.

Two front wheels 12 are mounted upon an axle 13 which is secured to a U-shaped bracket 14. Said bracket is mounted to swing about a pivot rod or pin 15, which is supported as by means of bracket 16, and which lies in a vertical plane extending longitudinally of the vehicle and is inclined upwardly toward the front at a suitable angle, for example approximately 60° to the horizontal. The bracket 16 is secured to an inclined transverse frame member 17 extending between and secured to the side members 3. As shown in the drawings, the side members 3 project forward beyond the front of the bottom member 2, and transverse member 17 is secured between said side members in front of the front end of the bottom member.

A front member 20 is also preferably provided, and propeller 21 may be rotatably mounted at the center of said front member, said propeller being free to turn upon movement through the air but being in no way connected with the driving or steering of the vehicle. A re-enforcing block 22 is also preferably provided between the side members 3 and directly beneath the central portion of wing 4, said block being secured to the side members and the wing being in turn secured to said block, to provide a rugged construction.

A rod 24 is also mounted adjacent the front end of the body and extending upwardly therefrom in position to be grasped by the hand of the person operating the vehicle. Said rod is preferably detachably mounted in order to permit more compact storing of the vehicle and for this purpose said rod may be tapered at its lower end so as to engage tightly by friction in an opening 26 in the floor 2. Said rod also passes with fairly tight engagement through an opening 27 in the wing 4 and re-enforcing block 22, which thus assist in holding the same rigidly in position.

The above described vehicle may be propelled in a manner similar to the ordinary scooter. The operator grasps the rod 24 in one hand, places one foot upon the floor 2 and between the side members 3, for example in the position indicated at 30, and propels the vehicle forward when necessary by pressure of the other foot upon the ground. It will be understood that a considerable momentum may be gained in this manner, after which the vehicle may be simply allowed to coast. The operator can easily balance himself on the vehicle when in motion, the rod 24 assisting materially in maintaining equilibrium. If it is desired to turn the vehicle in one direction or another, the same is simply tilted downwardly at the side toward which the vehicle is to be steered, as shown for example in Fig. 4. The forward inclination of pivot rod 15 causes axle 13 and front wheels 12 to turn toward the side which is tilted down, as indicated in Fig. 5 and hence causes the vehicle to swing or turn in that direction. The necessary tilting or tipping of the vehicle may be effected by simply shifting the weight of the body to one side or the other, assisted by movement of rod 24. After the vehicle has been turned to the desired extent, tilting of the same back to vertical position will cause the wheels to return to normal position. It will be evident, therefore, that the vehicle may be readily steered in a simple and effective manner.

In order to provide a noise similar to that of an aeroplane engine, I may, if desired, provide a flexible strip 32 of suitable spring metal, mounted on the floor 2 as by means of screw 33, and having its rear end in position to be engaged successively by a plurality of pins or other projections 34 on the rear wheel 7. Each of said projections engages said strip and bends the same downwardly and then releases the same, causing it to snap up against the next projection. A noise simulating that of an aeroplane motor is thus produced. The floor 2 is preferably cut away slightly as at 35 beneath the strip 32 so as to permit downward bending thereof. In order to permit movement of the strip 32 into or out of operative position, the same may be mounted to swing about the screw 33 aforesaid and may be provided with an upward projection 36 at its forward end, which is in position to be engaged by the heel of the operator so as to move it to operative position by outward pressure thereon. By movement of said strip in reverse direction, on the other hand, the rear end thereof may be moved away from wheel 7 sufficiently so as not to be engaged by the projections 34 aforesaid. When in this position the strip 32 is inoperative for the production of noise.

It will be seen from the above that the aeroplane idea is simulated throughout. Not only is the vehicle of the same general shape and appearance as an aeroplane (with the exception of rod 24), but also two wheels are provided in front and one in the rear, as in an aeroplane. Furthermore, the steering of the vehicle is accompanied by tilting thereof, in the same manner as an aeroplane tilts when making a turn. The use of rod 24 to assist in tilting or steering also simulates the manipulation of the control stick of an aeroplane.

I claim:

1. In a child's vehicle, a body comprising a bottom member and two side members extending upwardly from said bottom member and spaced apart sufficiently to permit access of a child's foot to said bottom member, an inclined transverse member secured to and extending between said side members in front of said bottom member and lying in a plane inclined upwardly toward the front of a vehicle, a pivot rod, means supporting said pivot rod upon said transverse member so as to be inclined upwardly toward the front of the vehicle, a supporting bracket rotatably mounted on said pivot rod, an axle member secured to said bracket and two wheels mounted at the respective ends of said axle.

2. A child's vehicle comprising a body, a single wheel rotatably mounted adjacent the rear end of said body, a pivot rod mounted adjacent the front end of said body and being inclined upwardly toward the front of the vehicle, a front axle, means pivotally supporting said front axle upon said pivot rod, wheels mounted at the respective ends of said axle, and a rod rigidly secured to said body and extending upwardly therefrom in position to be grasped in the hand of a child when riding the vehicle.

3. A child's vehicle as set forth in claim 2, said rod being detachably connected to said body.

4. In a child's vehicle, a body comprising a bottom member and two side members secured to said bottom member and extending upwardly therefrom and spaced apart sufficiently to permit access of a child's foot to said bottom member, a wing member extending across and above said side members at the front of the vehicle and means securing said wing member to the upper portions of said side members, and a rod rigidly mounted upon said bottom member and extending upwardly through said wing member into position to be grasped in the hand of a child riding the vehicle, said wing also engaging said rod to assist in holding the same in rigid position.

5. In a child's vehicle, a construction as set forth in claim 4, the means securing the wing member to said side members comprising a re-enforcing block extending beneath the central portion of said wing member and being secured to said side members and means securing said wing member to said re-enforcing block, said upwardly extending rod also passing through said re-enforcing block and said re-enforcing block also engaging said rod to assist in supporting the same.

6. In a child's vehicle, a wheel, a plurality of projections on said wheel, a strip of spring material mounted upon the vehicle and movable between a position of engagement with said projections in the rotation of said wheel and a position of non-engagement therewith, and means for moving said strip to either of said positions.

7. In a child's vehicle, a body having a portion adapted to support a child's foot, a wheel mounted to the rear of said portion of the body, a plurality of projections on said wheel, a strip of spring material pivotally mounted on said body so as to be swung into or out of position to be engaged by said projections upon rotation of said wheel, and an upward projection at the front of said strip and in position to be engaged by the child's foot when supported upon said portion of the body, to move said strip into said position.

In testimony whereof I have hereunto subscribed my name this 30th day of August, 1927.

THEODORE J. RYAN.